US005521387A

United States Patent [19]
Riedner et al.

[11] Patent Number: 5,521,387
[45] Date of Patent: * May 28, 1996

[54] RADIATION DETECTOR EMPLOYING SOLID-STATE SCINTILLATOR MATERIAL AND PREPARATION METHODS THEREFOR

[75] Inventors: Robert J. Riedner, Waukesha; Robert J. Lyons, Milwaukee, both of Wis.; Dominic A. Cusano; Charles D. Greskovich, both of Schenectady, N.Y.

[73] Assignee: General Electric Company, Milwaukee

[ * ] Notice: The portion of the term of this patent subsequent to Nov. 8, 2005, has been disclaimed.

[21] Appl. No.: 649,332

[22] Filed: Feb. 1, 1991

Related U.S. Application Data

[63] Continuation of Ser. No. 395,175, Aug. 18, 1989, abandoned, which is a continuation of Ser. No. 814,804, Dec. 30, 1985, abandoned.

[51] Int. Cl.$^6$ ............................................. C09K 11/78
[52] U.S. Cl. ............ 250/367; 252/301.17; 252/301.4 R; 501/152
[58] Field of Search ....................... 252/301.4 R, 301.17; 250/367; 501/152

[56] References Cited

U.S. PATENT DOCUMENTS

| | | | |
|---|---|---|---|
| 3,322,682 | 5/1967 | Thompson | 252/301.4 R |
| 3,545,987 | 12/1970 | Anderson | 106/39 |
| 3,639,932 | 2/1972 | Ferri et al. | 252/301.4 R |
| 3,640,887 | 2/1972 | Anderson | 252/301.1 |
| 3,666,676 | 5/1972 | Rabatin et al. | 252/301.4 R |
| 4,040,845 | 8/1977 | Richerson et al. | 106/38.9 |

(List continued on next page.)

FOREIGN PATENT DOCUMENTS

| | | |
|---|---|---|
| 792071 | 3/1958 | United Kingdom . |
| 1364008 | 8/1974 | United Kingdom . |

OTHER PUBLICATIONS

Lefever et al., "Transparent Yttrium Oxide Ceramics", *Materials Research Bulletin*, vol. 2, pp. 865–869, Pergamon Press (1967) no month.

Buchanan et al., "Cathodoluminescent Properties of the Rare Earths in Yttrium Oxide", *Journal of Applied Physics*, vol. 39, No. 9, pp. 4342–4347 (Aug. 1968).

Carnall et al., "Transparent $Gd_2O_3$ Ceramics and Phosphors", *Materials Research Bulletin*, vol. 7, pp. 647–653, Pergamon Press (1972) no month.

Rhodes, "Controlled Transient Solid Second–Phase Sintering of Yttria", *Journal of the American Ceramic Society*, vol. 64, No. 1, pp. 13–19 (Jan. 1981).

Greskovich et al., "Fabrication of Transparent $ThO_2$–Doped $Y_2O_3$", *American Ceramic Society Bulletin*, vol. 52, No. 5, pp. 473–478 (1973) no month.

*Primary Examiner*—Mark L. Bell
*Assistant Examiner*—C. M. Bonner
*Attorney, Agent, or Firm*—John H. Pilarski

[57] ABSTRACT

A polycrystalline ceramic scintillator exhibiting reduced afterglow includes between about 5 and 50 mole percent $Gd_2O_3$, between about 0.02 and 12 mole percent of either $Eu_2O_3$ or $Nd_2O_3$ as a rare earth activator oxide, and between about 0.003 and 0.5 mole percent of either $Pr_2O_3$ and $Tb_2O_3$ as an afterglow reducer. The remainder of the scintillator composition is $Y_2O_3$. The resulting scintillator is especially useful for a radiation detector of the type having a plurality of radiation receiving channels. A scintillator body is disposed in each channel so that radiation being received therein is incident on the scintillator body and causes the body to convert the incident radiation to light energy of a predetermined wavelength. The radiation detector also includes means for converting the light energy from the scintillator into electrical signals which are proportional to the amount of radiation incident on the scintillator body. Methods for preparing the scintillator of the present invention include sintering, sintering combined with gas hot isostatic pressing, and vacuum hot pressing.

21 Claims, 5 Drawing Sheets

U.S. PATENT DOCUMENTS

| | | | |
|---|---|---|---|
| 4,224,524 | 9/1980 | Suys et al. | 250/486 |
| 4,225,653 | 9/1980 | Brixner | 428/539 |
| 4,242,221 | 12/1980 | Cusano et al. | 252/301.4 H |
| 4,421,671 | 12/1983 | Cusano et al. | 252/301.4 F |
| 4,466,929 | 8/1984 | Greskovich et al. | 264/1.2 |
| 4,466,930 | 8/1984 | Greskovich et al. | 264/1.2 |
| 4,473,513 | 9/1984 | Cusano et al. | 264/1.2 |
| 4,518,545 | 5/1985 | Cusano et al. | 264/1.2 |
| 4,518,546 | 5/1985 | Greskovich et al. | 264/1.2 |
| 4,525,628 | 6/1985 | DiBianca et al. | 250/367 |
| 4,571,312 | 2/1986 | Greskovich et al. | 264/1.2 |
| 4,783,596 | 11/1988 | Riedner et al. | 252/301.4 R |
| 5,013,696 | 5/1991 | Greskovich et al. | 501/152 |

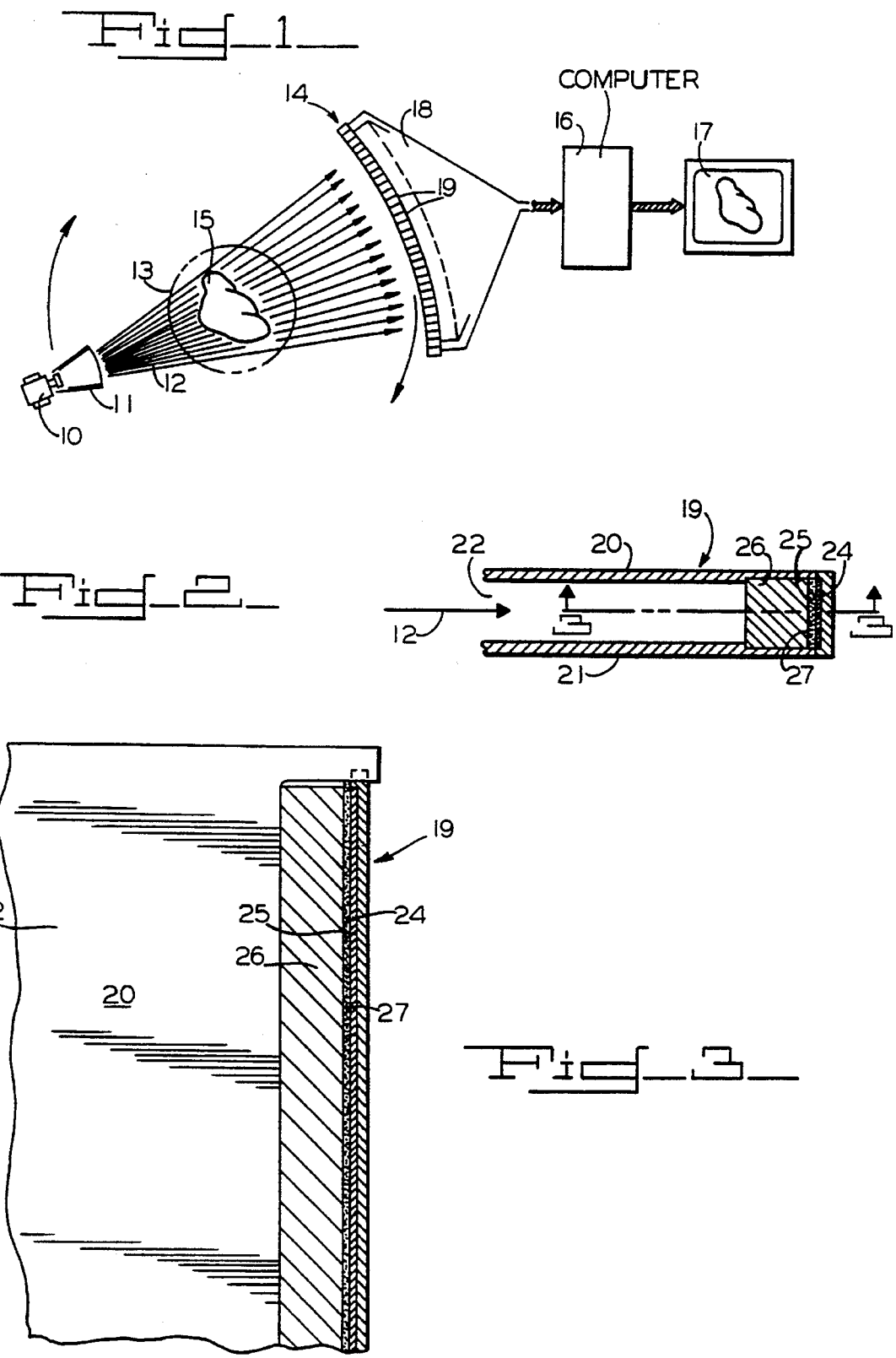

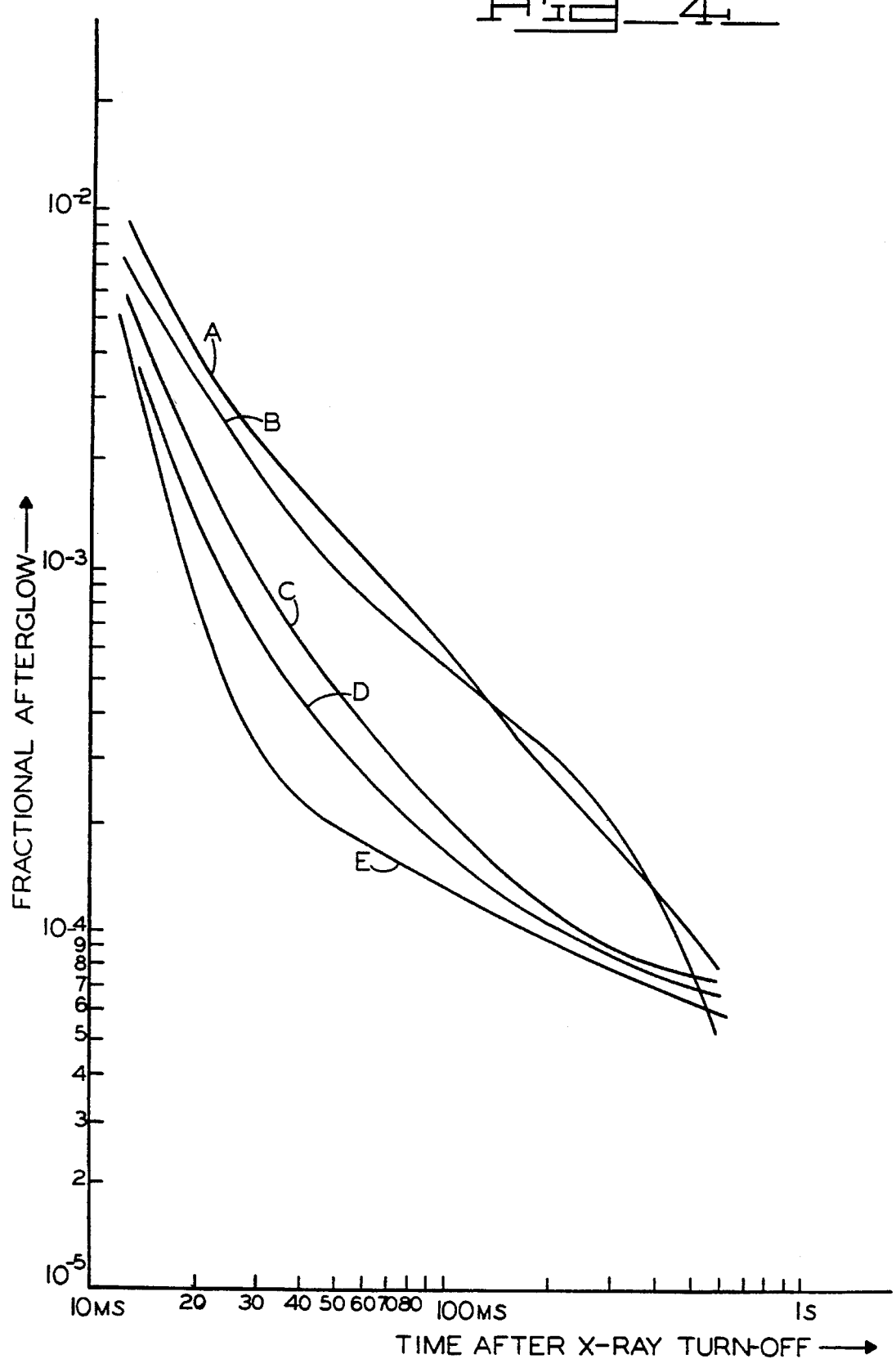
Fig_4

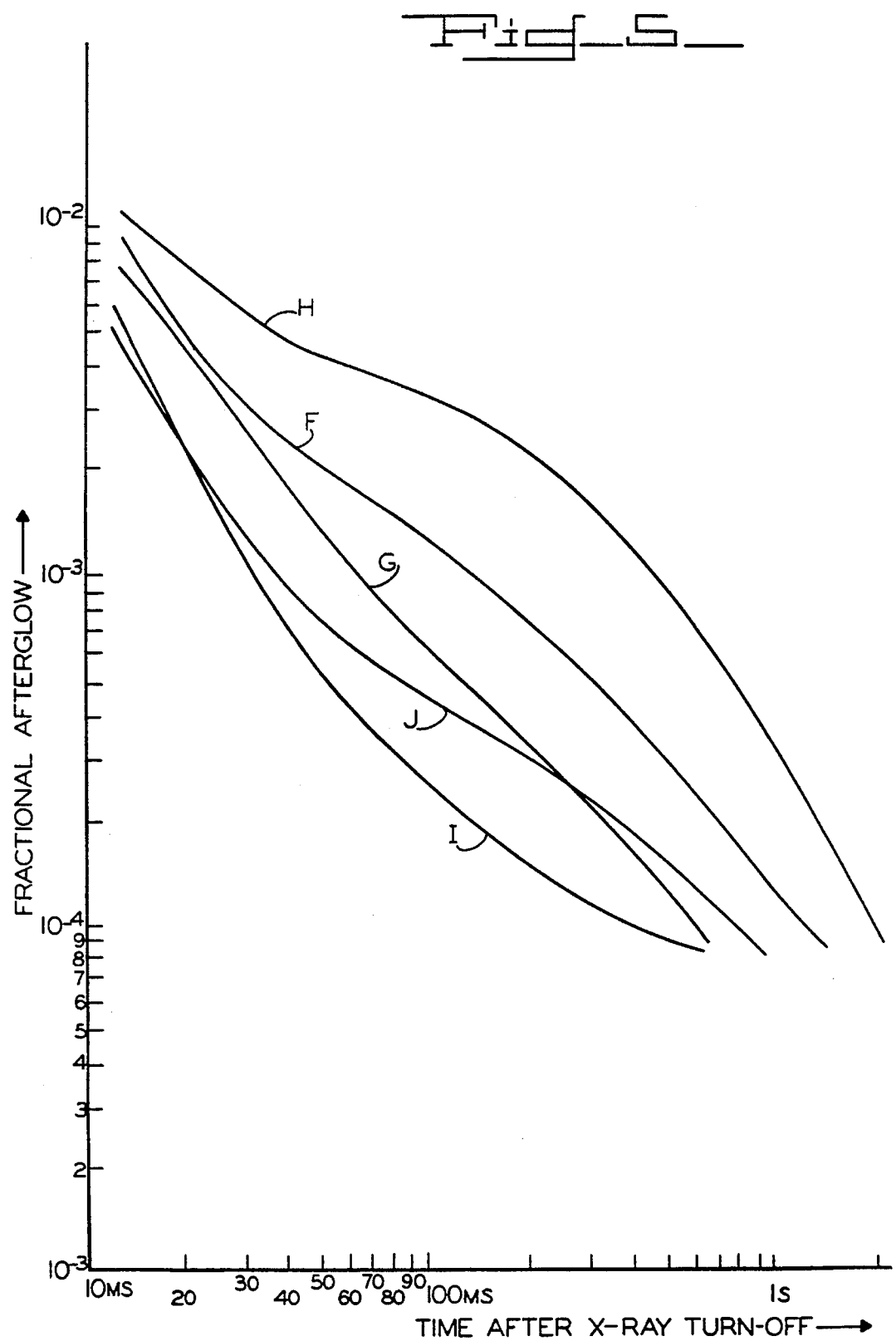

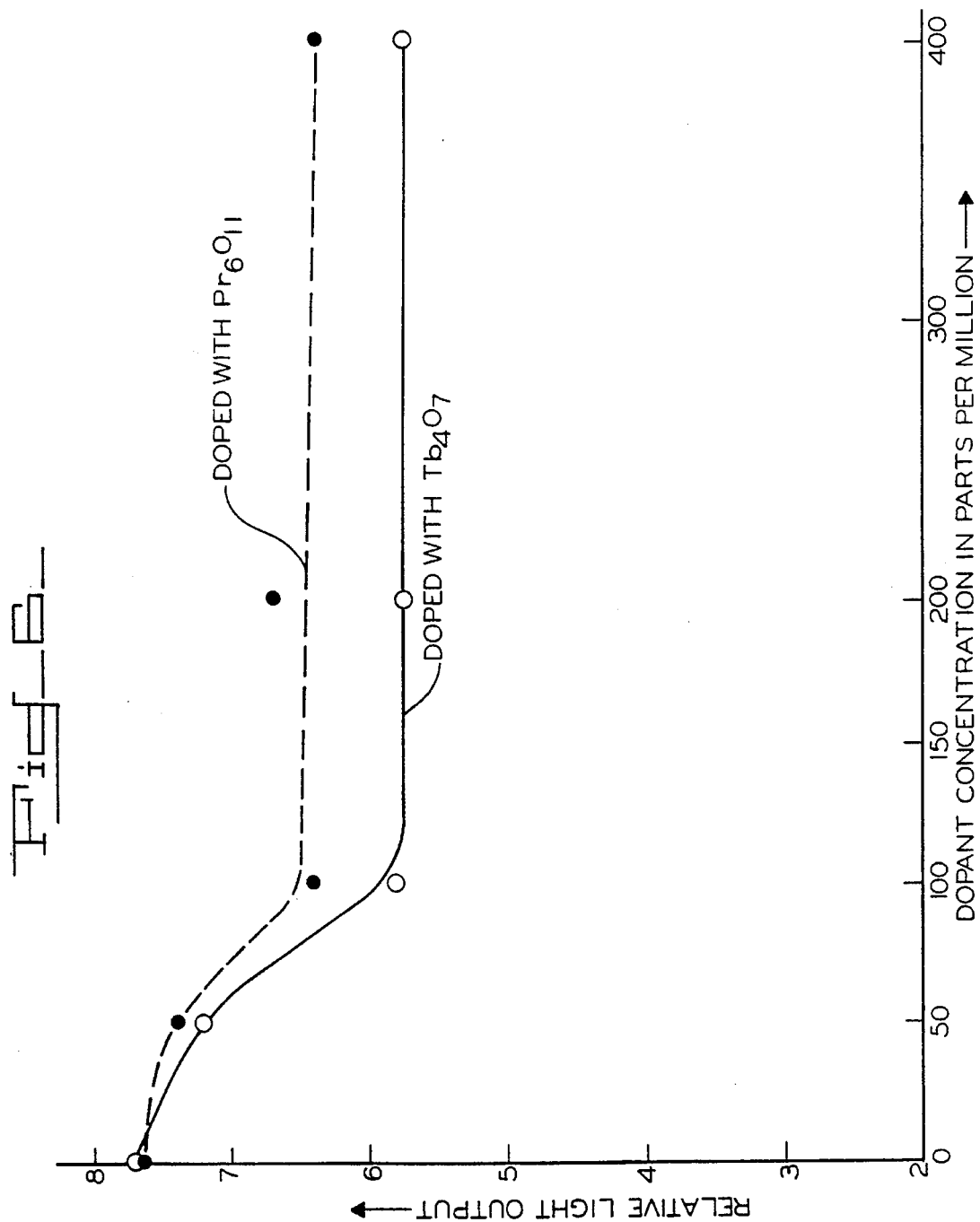

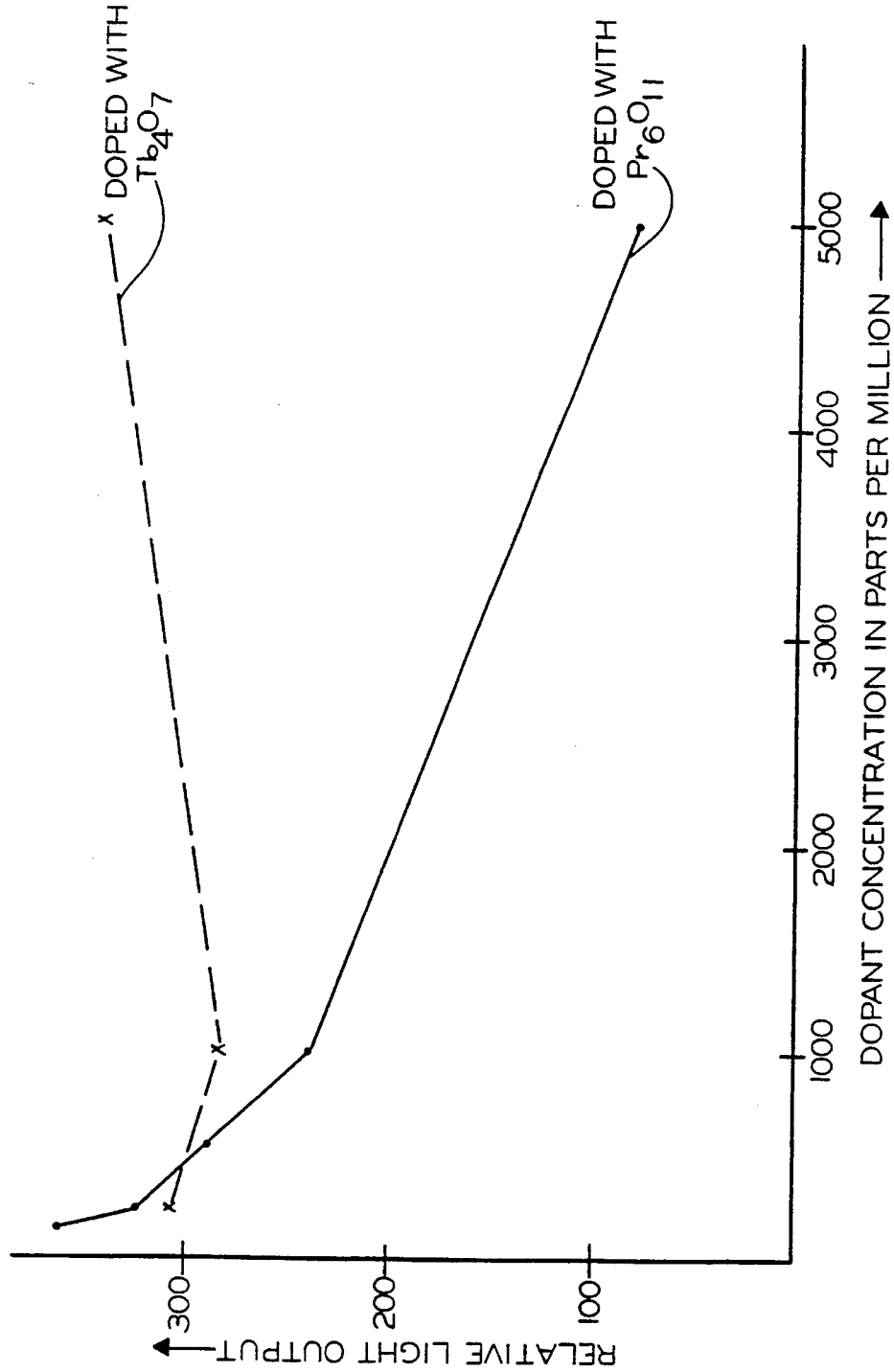

RADIATION DETECTOR EMPLOYING SOLID-STATE SCINTILLATOR MATERIAL AND PREPARATION METHODS THEREFOR

This is a continuation of Ser. No. 07/395175, filed Aug. 18, 1989, now abandoned, which is a continuation of Ser. No. 06/814804, filed Dec. 30, 1985, now abandoned.

RELATED APPLICATIONS

This patent application is related to U.S. application Ser. No. 629,027, filed Jul. 9, 1984, now abandoned, in the name of D. Cusano et al and assigned to the present assignee, which application is a continuation of U.S. application Ser. No. 389,812 filed Jun. 18, 1982, now abandoned.

BACKGROUND OF THE INVENTION

This invention relates to radiation detectors employing rare-earth-doped ceramic scintillators. More particularly, it relates to scintillator materials having improved afterglow characteristics.

Radiation detectors have long been used to detect penetrating radiation in such applications as x-ray counters and image intensifiers. More recently, such detectors have played an important role in computerized tomography (CT) scanners, digital radiography (DR), and other x-ray, gamma radiation, ultraviolet radiation, and nuclear radiation detecting applications.

Computerized tomography scanners are medical diagnostic instruments in which a subject is exposed to a relatively planar beam or beams of x-ray radiation, with the intensity of the beam varying in direct relationship to the energy absorption along a plurality of subject body paths. By measuring the x-ray intensity (i.e., the x-ray absorption) along these paths from a plurality of different angles or views, x-ray absorption coefficients can be computed for various areas in any plane of the body through which the radiation passes. These areas typically comprise approximately a square portion of about 1 mm. by 1 mm. The absorption coefficients are used to produce a display of the object being intersected by the x-ray beam, such as, for example, the bodily organs of a human subject.

An integral and important part of the scanner is the detector which receives the x-ray radiation that has been modulated by passage through the particular body under study. The x-ray detector generally contains a scintillator material which, when excited by the impinging x-ray radiation, emits optical wavelength energy. In typical medical or industrial applications, the optical output from the scintillator material is made to impinge upon a photoelectrically responsive material which produces electrical output signals. The amplitude of these signals is directly related to the intensity of the impinging x-ray radiation. The electrical signals are digitized for processing by digital computer means, which means generates the absorption coefficients in a form suitable for display on a cathode ray tube screen or on other permanent media.

In order to meet the specific and demanding requirements of computerized tomography applications, the scintillator material employed must be an efficient converter of x-ray radiation into optical radiation, in those regions of the electromagnetic spectrum which are most efficiently detected by photosensors such as photomultipliers or photodiodes. It is also desirable that the scintillator transmit the optical radiation efficiently, by avoiding optical trapping, so that optical radiation originating deep inside the scintillator body escapes for detection by externally situated photodetectors. The scintillator material should also have high x-ray stopping power, low hysteresis, spectral linearity, and short afterglow or persistence. High x-ray stopping power is desirable for efficient x-ray detection, because x-rays not absorbed by the scintillator escape detection. Hysteresis refers to the scintillator material property whereby the optical output varies for identical x-ray excitation, based on the irradiation history of the scintillator. For CT applications, typical detecting accuracies are on the order of one part in one thousand, for a number of successive measurements taken at a relatively high rate. Accordingly, low hysteresis is required in order to provide repeated precise measurements of optical output from each scintillator cell, and to provide substantially identical optical outputs for identical x-ray radiation exposure impinging on the scintillator body. Spectral linearity is important because x-rays impinging on the scintillator body typically include a number of different frequencies, and because the scintillator response to the radiation should be substantially uniform for all such frequencies. Afterglow or persistence is the tendency of the scintillator to continue emitting optical radiation for a time after termination of the x-ray excitation. Long afterglow results in blurring, with time, of the information-bearing signal. Furthermore, for applications requiring rapid sequential scanning, such as, for example, in imaging moving bodily organs, short afterglow is essential for rapid cycling of the detector.

Polycrystalline ceramic scintillators which exhibit many of the desirable properties outlined above are described in U.S. Pat. No. 4,421,671, issued Dec. 20, 1983 to D. Cusano et al, and in U.S. application Ser. No. 629,027, filed Jul. 9, 1984 in the name of D. Cusano et al and assigned to the present assignee (continuation of U.S. application Ser. No. 389,812 filed Jun. 18, 1982). The scintillators described therein are comprised of yttria and gadolinia, and include at least one of a variety of rare earth activators for enhancing luminescent efficiency. The scintillator composition may also include one or more of several disclosed transparency promoters and light output restorers. The above-referenced patents also disclose that luminescent afterglow of the yttria-gadolinia ceramic scintillators described therein may be reduced by adding ytterbium oxide ($Yb_2O_3$), strontium oxide (SrO), or calcium oxide (CaO). However, as CT systems are improved, meeting the demand for faster response times requires scintillator materials having improved afterglow.

Accordingly, it is an object of the present invention to provide a radiation detector exhibiting improved afterglow characteristics when used with a source of penetrating radiation.

It is another object of the present invention to provide a rare-earth-doped polycrystalline ceramic scintillator which is especially useful for CT, DR, and other x-ray detecting applications.

It is a further object of the present invention to provide a polycrystalline yttria-gadolinia ceramic scintillator exhibiting reduced luminescent afterglow.

It is also an object of the present invention to provide methods for preparing such scintillator bodies.

SUMMARY OF THE INVENTION

The polycrystalline ceramic scintillators of the present invention include between about 5 and 50 mole percent $Gd_2O_3$, between about 0.02 and 12 mole percent of either $Eu_2O_3$ or $Nd_2O_3$ as a rare earth activator oxide, and between about 0.003 and 0.5 mole percent of at least one afterglow reducer selected from the group consisting of $Pr_2O_3$ and $Tb_2O_3$. The remainder of the scintillator composition is $Y_2O_3$. A radiation detector employing such a scintillator comprises a detector array housing having a plurality of channels defined therein, for receiving the radiation. A polycrystalline ceramic scintillator having the above composition is disposed in each channel so that radiation being received by the channel is incident on the scintillator body, and so that the incident radiation causes the body to scintillate at a predetermined wavelength. The detector also includes means for detecting the predetermined wavelength scintillator energy from each of the scintillator bodies, with the detecting means being coupled to each scintillator body so as to produce a set of signals related to the radiation received in the respective channels of the detector array housing. Methods for preparing the yttria-gadolinia ceramic scintillator of the present invention include sintering, vacuum hot pressing, and sintering combined with gas hot isostatic pressing.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

FIG. 1 is a representational view depicting the elements of a typical CT scanner;

FIG. 2 is an end elevation, cross-sectional view schematically illustrating one channel of a radiation detector, in accordance with one embodiment of the present invention;

FIG. 3 is a cross-sectional view of the detector channel shown in FIG. 2, taken along line 3—3;

FIG. 4 illustrates graphically the effect on scintillator afterglow of increasing concentrations of $Pr_2O_3$;

FIG. 5 is a graph showing the effect on scintillator afterglow of increasing concentrations of $Tb_2O_3$; and FIGS. 6 and 7 are graphical illustrations of the dependence of the relative light output of the scintillator on the concentration of either $Pr_2O_3$ or $Tb_2O_3$.

DETAILED DESCRIPTION OF THE PREFERRED EMBODIMENTS

FIG. 1 shows in representational form the elements used in a typical CT scanner for the production, transmission, and detection of x-ray radiation. The scanner includes radiation source 10, for producing penetrating radiation. Radiation source 10 frequently comprises a rotating anode x-ray tube. The radiation produced by source 10 is collimated by collimator 11 to produce a thin beam of x-rays 12 which is projected through aperture 13 toward x-ray detector 14. A body to be examined, such as subject 15, is positioned within aperture 13 in the path of the fan beam of x-rays 12 in such a manner that the beam is attenuated as it passes through subject 15, with the amount of attenuation being dependent upon the density of subject 15. Radiation detector 14 comprises detector array housing 18 having a plurality of channels 19 defined therein. Channels 19 are configured so as to receive the attenuated fan beam of x-rays 12, and so as to produce electrical signals which are dependent on the intensity of the radiation received within each channel. The resulting electrical signals are therefore measures of the attenuation of the x-ray beam by the portion of the body through which the beam has passed.

In operation, electrical signal readings are taken from each channel 19 at a plurality of angular positions with respect to subject 15, while source 10 and detector 14 are rotated about aperture 13. The resulting readings are digitized and transmitted to computer 16, which uses one of a number of available algorithms to compute and construct a picture of the cross-section traversed by the fan beam of x-rays 12. The resulting picture is displayed on cathode ray tube 17, or, alternatively, may be used to create an image on permanent media such as photographic film or the like.

In an x-ray radiation detector, channels 19 typically comprise a plurality of collimated cells, with each cell being of the type schematically illustrated in FIG. 2. The cell width is defined by the distance between collimator plates 20 and 21, which plates define window 22 for receiving x-rays 12 along an incremental portion of the fan beam which the cell faces. As can be seen from a comparison of FIGS. 2 and 3, the cell width is considerably smaller than the cell length, that is, the dimension of the cell perpendicular to the plane of the fan beam. It is desirable to minimize the cell width in order to provide good spatial resolution of the fan beam. Typical cell dimensions in a practical radiation detector may be about 1 mm. for the cell width and about 20 mm. for the cell length, of which approximately 15 mm. is exposed to radiation. Polycrystalline ceramic scintillator body 26 is disposed in channel 19 so that x-ray radiation 12 being received by channel 19 is incident on scintillator body 26, by passing between collimator plates 20 and 21 and impinging upon scintillator body 26. This incident radiation causes body 26 to scintillate at a predetermined wavelength, thereby converting the incident radiation into lower energy radiation in the visible or near-visible spectrum. The radiation detector of the present invention further comprises means for detecting the predetermined wavelength scintillator energy from each scintillator body 26. The scintillator energy detecting means is coupled to each scintillator body 26 so as to produce a set of signals which are proportional to the intensity of the radiation received in each of the respective channels 19 of the detector array. In the embodiment illustrated in FIGS. 2 and 3, photodiode assembly 24 is mounted behind scintillator body 26. Active surface 25 of photodiode assembly 24 is disposed so as to underlie scintillator 26 and to receive the scintillaton radiation which body 26 produces. Various means are available for directing the light produced by scintillator 26 to active surface 25 of photodiode 24. For example, all of the faces of scintillator body 26, except the face adjacent to photodiode 24, may be treated to reflect inwardly any light incident upon those treated faces. In the embodiment shown in FIGS. 2 and 3, optical coupling material 27 is also employed. Coupling material 27 is disposed between scintillator 26 and photodiode 24 so as to enhance coupling of the light produced by scintillator 26 to active surface 25 of photodiode 24.

U.S. Pat. No. 4,421,671 and U.S. application Ser. No. 629,027, referenced above, disclose a class of polycrystalline ceramic scintillator bodies which are generally useful for CT and other x-ray detecting applications. The scintillators disclosed therein are made up of rare earth yttria-gadolinia hosts and trivalent rare earth activator oxides. The scintillator compositions may also include one or more of the transparency promotors and light output restorers described in those patents. The finished scintillator bodies are comprised of a cubic solid solution of the various chemical constituents.

Each of the scintillator compositions disclosed in the above-referenced documents includes $Gd_2O_3$, $Y_2O_3$, and at least one rare earth activator oxide. The resulting scintillator bodies have high x-ray stopping power, high radiant efficiency, high density, high uniformity, cubic structure, and are translucent-to-transparent in optical clarity. As used herein, the terms "transparent" and "translucent" refer to various degrees of optical clarity in the scintillator material. The cubic crystal structure of the disclosed scintillators provides the scintillator materials with optical attenuation coefficients typically less than 100 cm. $-1$, as measured by standard spectral transmittance tests on a polished scintillator material plate at the luminescent wavelength of the respective ion. Cubic materials are optically isotropic, that is, they have the same refractive index in all directions. Accordingly, light travelling through a cubic crystal structure consisting of a solid solution material follows a relatively short optical path. As a result, transparency and light output are enhanced. The scintillator compositions disclosed in the above-referenced documents can be made to be very dense, and, consequently, exhibit high x-ray stopping power. Stopping power is measured in terms of the distance an x-ray photon penetrates into the scintillator prior to its absorption. The absorbed x-ray photons are converted to optical wavelength photons which are detectable by photosensors. The x-ray stopping length of rare-earth-doped yttria-gadolinia polycrystalline ceramic scintillators is primarily dependant on $Gd_2O_3$ content, and increases with increased $Gd_2O_3$ concentration. A minimum of about 5 mole percent of $Gd_2O_3$ is needed in such scintillator compositions in order to meet the x-ray stopping power requirements for most practical detector designs. Finally, the luminescent efficiency of the scintillator compositions described above is enhanced by properly choosing the rare earth activator dopant. The combination of the rare earth activator oxide and the yttria-gadolinia host results in a scintillator which converts incident radiation into light output at a wavelength compatible with available photosensitive devices, and at a reasonable conversion efficiency.

In accordance with the present invention, scintillator body 26 employed in the type of radiation detector illustrated in FIGS. 2 and 3, has a composition consisting essentially of between about 5 and 50 mole percent $Gd_2O_3$ between about 0.02 and 12 mole percent of a rare earth activator oxide selected from the group consisting of $Eu_2O_3$ and $Nd_2O_3$, and between about 0.003 and 0.5 mole percent of at least one afterglow reducer selected from the group consisting of $Pr_2O_3$ and $Tb_2O_3$. The remainder of the scintillator composition is $Y_2O_3$. As used in the scintillator composition of the present invention, praseodymium and terbium function to reduce the luminescent afterglow of the scintillator material. Such afterglow is undesirable in radiation detectors for CT systems, because it leads to undesirable distortion of, and the presence of artifacts in, the reconstructed images. The afterglow phenomenom is divisable into primary or fundamental afterglow and secondary afterglow. Primary afterglow is of relatively short duration, and is thought to be associated with the specific rare earth activator involved. Secondary afterglow may be several times longer than the primary decay time, and is probably associated with the presence of additional electron-hole trapping centers created by native defects and/or low level impurities at various sites in the host crystal. It has been found that afterglow may be reduced by the addition of compensating dopants to the other constituents of the scintillator material. It is believed that the added dopants reduce afterglow by forming killer centers, which centers compete with the activator centers for electron-hole pairs that otherwise combine radiatively at the activator centers to produce luminescent output. For the scintillator compositions described in U.S. Pat. No. 4,421,671 and in U.S. application Ser. No. 629,027, $Yb_2O_3$, SrO and CaO were disclosed as dopants that may be added to the described compositions in order to reduce luminescent afterglow. Praseodymium and terbium were not recognized in those documents as being effective afterglow reducers. To the contrary, praseodymium and terbium were included among the list of rare earth elements which may be added to the basic yttria-gadolinia system as activators to enhance scintillator efficiency. The present inventors have discovered that, if either praseodymium or terbium is added to rare-earth-doped, yttria-gadolinia scintillator material, there is a significant improvement in scintillator afterglow. Unexpectedly, it has been determined that adding these elements in even such minute quantities as 0.003 mole percent produces a reduction in afterglow. More specifically, the present inventors have found that adding as little as 50 parts per million (ppm) of either praseodymium oxide or terbium oxide to a composition consisting of between about 5 and 50 mole percent gadolinium oxide and between about 0.02 and 12 mole percent of either europium oxide or neodymium oxide, with the remainder being yttrium oxide, significantly improves the afterglow characteristics of the material.

Referring now to FIG. 4, the effect produced on the scintillator afterglow by adding various concentrations of praseodymium oxide to the scintillator composition is graphically illustrated. The curves labeled A, B, C, D, and E in FIG. 4 depict the fractional afterglow (vertical axis) remaining at times greater than 10 milliseconds following the cessation of x-ray excitation (horizontal axis), for various afterglow reducer concentrations. Curve A is a plot of the afterglow data for a scintillator composition having 30 mole percent $Gd_2O_3$, 3 mole percent $Eu_2O_3$, and 67 mole percent $Y_2O_3$. For curves B through E various concentrations of praseodymium oxide were added to this baseline composition. Curves B through E depict the fractional afterglow data for scintillator compositions which contained 0.004, 0.008, 0.016, and 0.032 mole percent praseodymium oxide, respectively, and correspondingly less yttrium oxide. (These mole percentages of praseodymium oxide correspond to concentrations of 50, 100, 200 and 400 parts per million, respectively.) Each of the scintillator materials was processed as follows. The oxide compounds of gadolinia, europia and yttria were disolved in nitric acid to form a nitrate solution. For compositions containing praseodymium oxide, $Pr_6O_{11}$ was also dissolved in nitric acid. These two nitrate solutions were then mixed and added to a supersaturated solution of oxalic acid to produce a co-precipitated crystalline oxalate powder. The oxalate powder was washed and dried, and then calcined by heating it in air at 800° C. to form the desired oxide powder. The resulting oxide powder was then pressed into disks and sintered at approximately 2,000° C. to form the scintillator bodies. For each body, the light output and the luminescent afterglow under 68 keV x-ray radiation were measured and plotted. It is readily apparent from FIG. 4 that increasing the concentration of praseodymium oxide in the scintillator composition produces increasingly reduced scintillator afterglow. For example, at about 50 milliseconds after x-ray turn-off, fractional afterglow for a scintillator material containing 0.032 mole percent praseodymium oxide (curve E) is only approximately 0.02 percent of its value immediately upon termination of x-ray excitation, as compared to about 0.13 percent for a material without praseodymium oxide (curve A).

FIG. 5 illustrates similar results when terbium oxide is used as an afterglow reducer, in place of praseodymium oxide. Curve F is plot of afterglow data for a scintillator composition of 30 mole percent $Gd_2O_3$, 3 mole percent $Eu_2O_3$, and 67 mole percent $Y_2O_3$. (Curve F was obtained using a different sample of material than was used for Curve A.) Curves G through J show the afterglow characteristics for similar scintillator materials which additionally contain 0.0035, 0.007, 0.014, and 0.028 mole percent terbium oxide, respectively, and correspondingly less yttrium oxide. (These molded percentages of terbium oxide correspond to concentrations of 50, 100, 200, and 400 parts per million, respectively.) Each of these samples was processed in the same manner as described above in relation to FIG. 4, with $Tb_4O_7$ being used in place of $Pr_6O_{11}$. (It should be understood that $Pr_6O_{11}$ and $Tb_4O_7$ are converted to dissolved $Pr_2O_3$ and $Tb_2O_3$, respectively, in the scintillator composition upon heat treatment of the scintillator material during such preparation methods as, for example, sintering, vacuum hot pressing, and sintering combined with gas hot isostatic pressing.) With the exception of curve H, the data illustrated in FIG. 5 shows that increasing the concentration of terbium oxide in the scintillator material increasingly reduces scintillator afterglow. Curve H, for the sample containing 0.007 mole percent terbium oxide, exhibits an unusually high afterglow which, it is believed, is associated with foreign contamination of unknown origin. At about 50 milliseconds after x-ray turn-off, the sample containing 0.014 mole percent terbium oxide (Curve J) exhibited approximately 0.053 percent of the luminescence present immediately after x-ray shut-off, as compared with about 0.2 percent fractional afterglow for the sample without terbium oxide (Curve F).

The present inventors have also made determinations of the fractional afterglow of scintillator compositions employing neodymium as the rare earth activator, in place of europium. The processing techniques used to form the various materials into a scintillator body and the measurement methods employed to obtain the fractional afterglow data were similar to those described hereinabove in relation to FIGS. 4 and 5. For a scintillator composition of 30 mole percent $Gd_2O_3$, 69.9 percent $Y_2O_3$, and 0.1 mole percent $Nd_2O_3$, the addition of a small amount of praseodymium oxide had no significant effect on scintillator afterglow. At approximately 160 milliseconds after x-ray turn-off, the fractional afterglow of the scintillator composition without praseodymium was about 0.3 percent. When about 0.008 mole percent of praseodymium oxide was added to the composition, and the amount of yttrium oxide was correspondingly reduced, the afterglow at 160 milliseconds was virtually unchanged. However, for a scintillator material containing 0.25 mole percent $Nd_2O_3$, a significant reduction in scintillator afterglow was observed when praseodymium oxide was added to the base composition. At 160 milliseconds after x-ray turn-off, a scintillator composed of 30 mole percent $Gd_2O_3$, 69.75 mole percent $Y_2O_3$, and 0.25 mole percent $Nd_2O_3$ exhibited a fractional afterglow of 1.3 percent. When 0.008 mole percent of praseodymium oxide was added to this composition in place of a corresponding amount of $Y_2O_3$, the fractional afterglow after the same elapsed time was 0.2 percent, which represents about a six-fold improvement. Another scintillator sample, having the same composition of 0.25 mole percent $Nd_2O_3$, 69.75 percent $Y_2O_3$, and 30 mole percent $Gd_2O_3$, was prepared using higher purity materials and exhibited an afterglow of 0.04 percent at 160 milliseconds after x-ray turn-off. When praseodymium oxide in a concentration of 0.08 mole percent was added to this last scintillator composition in place of a corresponding amount of $Y_2O_3$, the scintillator afterglow at 160 milliseconds was reduced to 0.018 percent.

The reduction in luminescent afterglow that is achieved by the addition of either praseodymium oxide or terbium oxide to the rare-earth-doped yttria-gadolinia ceramic scintillator of the present invention is accompanied by a reduction in the light output of the scintillator, in response to incident x-ray radiation. However, at least for the concentrations claimed by the present applicants, the reduction in light output is not so severe as to be unacceptable. FIG. 6 graphically illustrates the dependence of relative light output of the scintillator on the concentration of either praseodymium oxide or terbium oxide in the scintillator composition, for relatively small dopant concentrations. The data shown in FIG. 6 were obtained using a base scintillator composition of 30 mole percent $Gd_2O_3$, 3 mole percent $Eu_2O_3$, and 67 mole percent $Y_2O_3$. The light output as a function of dopant concentration was obtained by adding increasing concentrations of terbium oxide and praseodymium oxide to the base material in place of corresponding amounts of $Y_2O_3$. The scintillator samples were prepared in accordance with the processing techniques described hereinabove in relation to FIGS. 4 and 5, and the light output of each sample was measured under 68 keV x-ray radiation. It can be seen from FIG. 6 that doping the base composition with 100 parts per million (ppm) of praseodymium oxide, which corresponds to approximately 0.008 mole percent of the scintillator composition, reduces the relative light output of the scintillator by about 17 percent. Doping the base composition with 100 ppm of terbium oxide, which corresponds to approximately 0.007 mole percent of the scintillator composition, causes a drop in light output of about 24 percent. FIG. 7 shows similar light output data for higher concentrations of the praseodymium and terbium dopants. The data shown therein were obtained using the same base scintillator composition of 30 mole percent $Gd_2O_3$, 3 mole percent $Eu_2O_3$, and 67 mole percent $Y_2O_3$.

The relative light output data depicted in FIGS. 6 and 7 indicate that increasing the concentration of either praseodymium oxide or terbium oxide in the scintillator composition increasingly reduces the scintillator light output in response to a given source of excitation radiation. For applications such as CT and DR, the scintillator light output can be of paramount importance. Where it is desirable to minimize the reduction in scintillator light output while simultaneously obtaining the benefit of improved afterglow characteristics, it is preferable to limit the concentrations of praseodymium oxide and terbium oxide to less than about 500 ppm (approximately 0.04 mole percent). For many conventional CT systems, the dual objectives of maintaining high light output and reducing luminescent afterglow can be achieved by limiting the concentration of the afterglow reducer to less than about 200 ppm (approximately 0.016 mole percent). The present inventors have found that the addition of 150 ppm (approximately 0.012 mole percent) praseodymium oxide to a scintillator composition made up of 30 mole percent $Gd_2O_3$, 3 mole percent $Eu_2O_3$, and 66.988 mole percent $Y_2O_3$ provides an extremely useful CT scintillator material having both good light output and improved afterglow characteristics.

Either europium or neodymium may be used in the scintillator composition of the present invention to function as an activator for enhancing scintillator efficiency. Generally, the rare earth activator concentration may range between 0.02 and 12 mole percent. Optimum concentration of $Eu_2O_3$ is between about 1 and 6 mole percent. $Nd_2O_3$ is preferably added in concentrations of between about 0.05 and 1.5 mole percent. The radiation conversion characteristics and the decay speed of the resulting scintillators are somewhat different for a europium activator than they are for a neodymium activator. When europium is employed, the principal emission wavelength is about 611 nm, and the primary decay speed is on the order of 1 millisecond. The emission wavelength of 611 nm is very near the peak response of the PIN-type photodiodes which are typically used in CT applications. When neodymium is employed as the activator, the principal emission wavelength is in the infrared region, and the primary decay speed is on the order of about 0.4 milliseconds. Accordingly, neodymium offers a faster response scintillator, at the expense of some loss in detector efficiency due to somewhat of a mismatch between the principal emission wavelength of the scintillator and the peak response of PIN-type photodiodes.

The concentration of $Gd_2O_3$ may generally range between about 5 mole percent and 50 mole percent. As noted hereinabove, materials containing less than about 5 mole percent $Gd_2O_3$ exhibit x-ray stopping power which is insufficient for most practical detector designs. Materials having more than about 50 mole percent $Gd_2O_3$ become increasingly monoclinic in crystalline structure. Such materials are characterized by lower relative light outputs and poor optical clarity, due to grain boundary cracking and non-uniform crystalline structure. Materials having such non cubic structure suffer from appreciable light scattering and reabsorption due to a relatively longer effective light path length, which decreases the amount of light available for detection by external photosensors. The preferred range of $Gd_2O_3$ concentration is between about 20 and 40 mole percent.

The ceramic scintillators of the present invention may be prepared by sintering, sintering plus gas hot isostatic pressing, and vacuum hot pressing techniques. A preliminary step in the fabrication of the scintillator by any of these methods is the preparation of a suitable powder containing the desired scintillator material constituents. In one method for preparing such a powder, submicron-to-micron powders of yttria and gadolinia having purities of, for example, 99.99 percent to 99.9999 percent are mixed with the desired rare earth activators in the form of oxides, oxalates, carbonates, or nitrates, and mixtures thereof. The selected constituents may be mixed in an agate mortar and pestle or in a ball mill using water, heptane, or alcohol as liquid vehicles. Dry milling may also be used for mixing and for breaking up powder aggregates, and preferably includes employing a grinding aid such as 1 to 5 weight percent of stearic acid or oleic acid to prevent powder packing or sticking inside the ball mill. If any of the chemical constituents are added in the form of nitrates, carbonates, or oxalates, a calcining step is required to obtain the corresponding oxides prior to fabrication of the ceramic scintillator by any of the methods described hereinbelow.

A wet chemical oxalate method may also be employed to obtain the desired scintillator starting powder. The various materials may be dissolved in nitric acid to form nitrates, or the selected molar percentages of the nitrates of the predetermined chemical constituents may be dissolved in water. The nitrate solution of the desired scintillator material constituents is added to an oxalic acid solution which is, for example, 80 percent saturated at room temperature, resulting inco-precipitation of the respective oxalates. These oxalates are washed, neutralized, and filtered and may be dried in air at about 100° C. for approximately eight hours. The oxalates are then calcined by heating them in air to between about 700° C. and 900° C. for a time ranging from one to four hours, to form the corresponding oxides. Preferably, if either the hot pressing or the sintering method is to be used to prepare the scintillator, the oxalates and/or the resulting oxides are milled by one of several methods, such as ball, colloid, or fluid energy milling, to enhance optical clarity. It should also be noted that the optical clarity of the scintillator is typically improved by milling, regardless of the preparation method employed.

One method for preparing the ceramic scintillator of the present invention comprises preparing a multicomponent powder of preselected powder constituents by one of the powder preparation methods outlined above, and then pressing the powder into powder compacts. The powder compacts may be formed either by die pressing at pressures between about 3,000 psi and 15,000 psi, or by die pressing followed by isostatic pressing at between about 10,000 and 125,000 psi, in order to further increase the density of the powder compact. As a final step, the powder compact is sintered to yield a transparent-to-translucent polycrystalline ceramic scintillator body. The sintering step is conducted by heating the compact in vacuum or in a reducing or oxidizing atmosphere at a rate of between approximately 100° C. per hour and 700° C. per hour, to the sintering temperature of between about 1,800° C. and 2,100° C. This sintering temperature is held for between about one and 30 hours, and then the compacts are cooled to room temperature over a period of time ranging from about two to ten hours. Alternatively, the sintering sequence may include a hold step at a temperature lower than the final sintering temperature. For example, the powder compact may be heated at a rate of between about 300° C. per hour and 400° C. per hour to a holding temperature of between about 1,600° C. and 1,700° C. After a holding period ranging from about 1 hour to 20 hours, the temperature may be raised at a rate of between about 25° C. per hour and 75° C. per hour, to a temperature between about 1,800° C. and 2,100° C., for final sintering for a period of between about 1 and 10 hours. Additionally, if any grinding aids or compaction aids were used in the powder preparation and pressing steps, an oxidation treatment to remove all organic additives may be employed prior to the sintering phase. Furthermore, if the resulting scintillator is discolored due to, for example, oxygen deficiency in the sintering atmosphere, the ceramic may be made transparent to visible light by a suitable oxidation treatment. As an example, the scintillator may be heated for between about 1 and 20 hours at a temperature between about 800° C. and 1,200° C. in an oxygen-containing atmosphere.

A second method for preparing the ceramic scintillators of the present invention involves a combination of the processes of sintering and gas hot isostatic pressing (GHIP). Although the starting oxide powder may be prepared by either of the powder preparation methods described hereinabove, the oxalate co-precipitation method is preferred for this second method of preparing the scintillator. However, milling of the oxalate and/or oxide powders is not required in order to produce transparent ceramics by the process of sintering combined with GHIP. After preparation of the powder, a powder compact is formed by cold pressing at pressures of between about 3,000 and 10,000 psi, followed by isostatic pressing at pressures of between 15,000 and 125,000 psi. The powder compact is presintered to between 93 and 98 percent of its theoretical density, by heating the compact for between about 1 and 10 hours at a temperature between about 1,500° C. and 1,700° C. The presintered compacts are then gas hot isostatically pressed at pressures between about 1,000 psi and 30,000 psi and at temperatures between about 1,500° C. and 1,800° C. for a period of about 1 to 2 hours. If a carbon element furnace is used for the GHIP process, any resulting black appearance of the ceramic scintillator may be removed, and the sample rendered transparent to visible light, by a suitable oxidation treatment, such as, for example, heating in air at a temperature of approximately 1,200° C. for about 32 hours. Alternatively, the GHIP process may be carried out in a molybdenum element furnace.

The scintillators of the present invention may also be prepared by vacuum hot pressing. For this fabrication method, the multicomponent powder is preferably prepared by the aforedescribed oxalate co-precipitation process. The calcined oxalate powder is pressed at a first pressure and temperature for a predetermined period of time, and then the temperature and pressure are increased and held for a second period of time. Preferably, the powder is subjected to a pressure of about 1,000 to 1,200 psi at a temperature in the range of 600° C. to 700° C., under a vacuum of less than 200 microns for period of about 1 hour. The pressure is then raised to the range of 4,000 to 10,000 psi, and the temperature is raised to the range of 1,300° C. to 1,600° C. These conditions are maintained for a period of between about ½ and 4 hours, after which time the sample is furnace cooled to room temperature. Again, if the resulting scintillator is discolored due to oxygen deficiency in the furnace atmosphere during hot pressing, or for other reasons, the ceramic may be made optically clear by oxidizing the sample in air or in an oxygen-containing atmosphere at a temperature of between about 800° C. and 1,200° C. for a time between about 1 and 20 hours. Any residual discoloration may be removed by conventional grinding and polishing techniques.

The foregoing describes a radiation detector which exhibits improved afterglow characteristics when used with a source of penetrating radiation. The rare-earth-doped polycrystalline ceramic scintillator of the present invention exhibits reduced luminescent afterglow, and is especially useful for CT, DR, and other x-ray detecting applications. The scintillator preparation methods of the present invention produce scintillator materials having high x-ray stopping power, cubic crystalline structure, high optical clarity, and high radiant efficiency. The resulting ceramics also have good mechanical properties and can easily withstand the cutting, polishing, and mounting processes associated with incorporating bars of the scintillator material into the relatively tight-tolerance dimensions of a CT scanner.

While the invention has been described in detail herein in accord with certain preferred embodiments thereof, many modifications and changes therein may be effected by those skilled in the art. For example, while a "rotate-rotate" scanner geometry has been shown in FIG. 1, the radiation detector of the present invention is also useful for other types of CT scanner geometry, including a "rotate only" geometry wherein the detector ring is fixed. Also, while the channels of the x-ray detector have been shown in FIGS. 2 and 3 as being rectangular in cross section, other suitable cross-sectional shapes may be employed. Accordingly, it is intended by the appended claims to cover all such modifications and changes as fall within the true spirit and scope of the invention.

The invention claimed is:

1. A radiation detector for a computerized tomography scanner exhibiting improved afterglow characteristics when used with a source of penetrating x-ray radiation, said radiation detector comprising:

a detector array housing;

a plurality of channels defined in said housing, for receiving said radiation;

a polycrystalline ceramic scintillator body disposed in each said channel so that x-ray radiation being received by said channel is incident on said scintillator body, and so that said incident radiation causes said body to scintillate at a wavelength, the composition of said scintillator body consisting essentially of between about 5 and 50 mole percent $Gd_2O_3$, between about 0.02 and 12 mole percent of a rare earth activator oxide selected from the group consisting of $Eu_2O_3$ and $Nd_2O_3$, and between about 0.008 and 0.5 mole percent of at least one afterglow reducer selected from the group consisting of $Pr_2O_3$ and $Tb_2O_3$, the remainder of said composition being $Y_2O_3$; and means for detecting said wavelength scintillator energy emitted from each said scintillator body and for generating electrical signals in response thereto, said detecting means being coupled to each said scintillator body so as to produce a set of signals related to the x-ray radiation received in the respective channels of said detector array housing.

2. The detector of claim 1 wherein $Gd_2O_3$ is present in an amount of between about 20 and 40 mole percent.

3. The detector of claim 1 wherein said rare earth activator oxide is $Eu_2O_3$ present in an amount of between about 1 and 6 mole percent.

4. The detector of claim 1 wherein said rare earth activator oxide is $Nd_2O_3$ present in an amount of between about 0.05 and 1.5 mole percent.

5. The detector of claim 1 wherein said afterglow reducer is $Pr_2O_3$ present in an amount of between about 0.008 and 0.04 mole percent.

6. The detector of claim 1 wherein said afterglow reducer is $Tb_2O_3$ present in an amount of between about 0.008 and 0.035 mole percent.

7. The detector of claim 1 wherein said afterglow reducer is $Pr_2O_3$ present in an amount of between about 0.004 and 0.016 mole percent.

8. The detector of claim 1 wherein said afterglow reducer is $Tb_2O_3$ present in an amount of between about 0.008 and 0.014 mole percent.

9. A polycrystalline ceramic scintillator exhibiting improved afterglow characteristics, said scintillator comprising a composition consisting essentially of between about 5 and 50 mole percent $Gd_2O_3$, between about 0.02 and 12 mole percent of a rare earth activator oxide selected from the group consisting of $Eu_2O_3$ and $Nd_2O_3$, and between about 0.008 and 0.5 mole percent of at least one afterglow reducer selected from the group consisting of $Pr_2O_3$ and $Tb_2O_3$, the remainder of said composition being $Y_2O_3$.

10. The scintillator of claim 9 wherein $Gd_2O_3$ is present in an amount of between about 20 and 40 mole percent.

11. The scintillator of claim 9 wherein said rare earth activator is $Eu_2O_3$ present in an amount of between about 1 and 6 mole percent.

12. The scintillator of claim 9 wherein said rare earth activator is $Nd_2O_3$ present in an amount of between about 0.05 and 1.5 mole percent.

13. The scintillator of claim 9 wherein said afterglow reducer is present in an amount of between about 0.008 and 0.04 mole percent.

14. A polycrystalline ceramic scintillator exhibiting improved afterglow characteristics, said scintillator comprising a composition consisting essentially of between about 5 and 50 mole percent $Gd_2O_3$, between about 0.02 and 12 mole percent of a rare earth activator oxide selected from the group consisting of $E_2O_3$ and $Nd_2O_3$, and between about 0.008 and 0.016 mole percent of at least one afterglow reducer selected from the group consisting of $Pr_2O_3$ and $Tb_2O_3$, the remainder of said composition being $Y_2O_3$.

15. The scintillator of claim 14 wherein $Gd_2O_3$ is present in an amount of between about 20 and 40 mole percent.

16. The scintillator of claim 14 wherein said rare earth activator is $Eu_2O_3$ present in an amount of between about 1 and 6 mole percent.

17. The scintillator of claim 14 wherein said rare earth activator is $Nd_2O_3$ present in an amount of between about 0.05 and 1.5 mole percent.

18. The scintillator of claim 14 wherein $Gd_2O_3$ is present in an amount of about 30 mole percent, and wherein said rare earth activator oxide is $Eu_2O_3$ present in an amount of about 3 mole percent.

19. The scintillator of claim 18 wherein said afterglow reducer is present in an amount of between about 0.01 and 0.012 mole percent.

20. A radiation detector exhibiting improved afterglow characteristics when used with a source of penetrating radiation, said radiation detector comprising:

a detector array housing;

a plurality of channels defined in said housing, for receiving said radiation;

a polycrystalline ceramic scintillator body disposed in each said channel so that radiation being received by said channel is incident on said scintillator body, and so that said incident radiation causes said body to scintillate at a wavelength, the composition of said scintillator body consisting essentially of between about 5 and 50 mole percent $Gd_2O_3$, between about 0.02 and 12 mole percent of a rare earth activator oxide selected from the group consisting of $Eu_2O_3$ and $Nd_2O_3$, and between about 0.008 and 0.5 mole percent of an afterglow reducer consisting of $Pr_2O_3$, the remainder of said composition being $Y_2O_3$; and means for detecting said wavelength scintillator energy emitted from each said scintillator body and for generating electrical signals in response thereto, said detecting means being coupled to each said scintillator body so as to produce a set of signals related to the radiation received in the respective channels of said detector array housing.

21. A polycrystalline ceramic scintillator exhibiting improved afterglow characteristics, said scintillator comprising a composition consisting essentially of between about 5 and 50 mole percent $Gd_2O_3$, between about 0.02 and 12 mole percent of a rare earth activator oxide selected from the group consisting of $Eu_2O_3$ and $Nd_2O_3$, and between about 0.008 and 0.016 mole percent of an afterglow reducer consisting of $Pr_2O_3$, the remainder of said composition being $Y_2O_3$.

* * * * *